(12) United States Patent
Dillon

(10) Patent No.: US 6,637,687 B2
(45) Date of Patent: Oct. 28, 2003

(54) SHEARBAR FOR A FORAGE HARVESTER

(75) Inventor: Joseph Dillon, Athlone (IE)

(73) Assignee: Lund International B.V., Couty Westmeath (IE)

( * ) Notice: Subject to any disclaimer, the term of this patent is extended or adjusted under 35 U.S.C. 154(b) by 0 days.

(21) Appl. No.: 10/156,531

(22) Filed: May 28, 2002

(65) Prior Publication Data

US 2002/0179759 A1 Dec. 5, 2002

(30) Foreign Application Priority Data

Jun. 5, 2001 (IE) .......................................... S20010543

(51) Int. Cl.7 ............................................... B02C 18/16
(52) U.S. Cl. ...................................... 241/300; 241/242
(58) Field of Search ................................ 241/300, 242, 241/293, 294

(56) References Cited

U.S. PATENT DOCUMENTS 3,805,660 A    4/1974  Burrough
4,425,260 A    1/1984  Eby

FOREIGN PATENT DOCUMENTS

| DE | 8700403 | 1/1987 |
| EP | 0022053 A1 | 1/1981 |
| EP | 0829198 A1 | 3/1998 |
| EP | 0878123 A3 | 11/1998 |
| EP | 0878123 A2 | 11/1998 |

*Primary Examiner*—Mark Rosenbaum
(74) *Attorney, Agent, or Firm*—Van Dyke, Gardner, Linn & Burkhart, LLP

(57) ABSTRACT

A shearbar comprises an elongated mild steel body 10 having a top surface 14 covered with a layer of hardfacing material 16 along at least one longitudinal edge 18 to act as a counter knife to a rotary cutter. To resist the development of a wear gully on the vertical side of the body 10 below the cutting edge of the hardfacing material 16 the body has a region 22, having a hardness intermediate that of the steel body and the hardfacing layer, extending along and immediately below the longitudinal edge 18 of the hardfacing layer. In one embodiment the region is an inlay of tool steel. In another embodiment the region is formed by heat-hardening the corners of the body 10 itself.

8 Claims, 2 Drawing Sheets

(a)

(b)

(c)

(d)

(e)

(f)

(g)

(h)

(i)

SHEARBAR FOR A FORAGE HARVESTER

This application claims priority from Irish Patent Application No. S2001-0543, filed on Jun. 5, 2001, by Joseph Dillon, entitled A SHEARBAR FOR A FORAGE HARVESTER.

TECHNICAL FIELD AND BACKGROUND OF THE INVENTION

This invention relates to a shearbar for a forage harvester.

When harvesting forage material such as grass, maize and other standing plants, the plant material is first cut from its root, close to the ground, and then conveyed into the forage harvester to a rotary cutter. The rotary cutter is typically a drum carrying a series of knives whose purpose is fine chopping of the crop conveyed into the harvester. The shearbar is located such that in use the knives successively approach the shearbar at an angle to cut the maize or other crop at the edge of the shearbar by a scissors-like action. The edge of the shearbar thus acts as a fixed counter knife to the knives of the rotary cutter.

When the plant material is conveyed into the machine it passes over and wears the top surface of the shearbar. Also, the cutting action and crop flow on the cutting edge of the shearbar contributes to wear and dulling of the shearbar edge. Depending on the plant material being harvested there can be significant wear in a relatively short space of time. This can be exacerbated by sand and grit on the leaves and stalks of the crop.

As a method of preventing or slowing wear, the industry has applied a wear resistant coating (cladding) known as hardfacing to the top surface of the shearbar, such hardfacing extending to the cutting edge. For example, a top coating of tungsten or chromium carbide, or other carbide-based hardfacing, in the region of 1–2 mm thick has been used.

The top coating of hardfacing when ground or machined to the desired size of the finished part provides a square edge for the knives on the drum to cut against. It also provides significant wear protection against erosion caused by a large volume of abrasive plant matter passing over the top of the shearbar. The sharp square edge is important for reduction of the load on the machine required to cut the crop and also in prolonging the life of the knife and the shearbar.

A problem with this construction is the development of a wear gully on the vertical side of the shearbar below the cutting edge of the wear resistant coating. This wear gully appears in the main body of the shearbar which is typically made of a mild steel, a medium carbon alloy steel of relatively low hardness or a plain carbon steel of low hardness. As the worn area increases in depth and size, the cutting edge of the coating becomes unsupported underneath and projects freely from the main body of the shearbar. When unsupported, the coating can chip when it comes into impact with items such as stones or foreign objects picked up by the harvester.

It is an object of the present invention to avoid or mitigate this problem.

SUMMARY OF INVENTION

According to the present invention there is provided a shearbar comprising an elongated steel body having a top surface covered with a layer of hardfacing material along at least one longitudinal edge to act as a counter knife to a rotary cutter, the body having a region extending along and immediately below the longitudinal edge of the hardfacing layer, the region having a hardness intermediate that of the steel body and the hardfacing layer.

In one embodiment the said region is an inlay. In another embodiment it is a locally heat-hardened portion of the body.

The introduction of an inlay or heat-hardened portion below the edge of the hardfacing layer prolongs the life of the shearbar as it 'bridges the gap' in wear resistance between the relatively soft steel body and the very hard hardfacing material.

In the case of an inlay it is preferably made of high alloy or 'tool' steel, most preferably with hardness of from 40 to 70 Hrc. The use of 'tool' steel has the added advantage of high impact resistance, enhancing the performance of the shearbar under a range of harvesting conditions. This performance enhancement would not be achievable with thermal sprayed hardfacing or PTA deposit hardfacing which are common in the industry.

Various prior examples of shearbars are shown in (a) to (i) of FIG. 5, none of which solve the foregoing problem or do not do so except at considerable expense. The drawings shown in FIG. 5 are cross-sectional views of shearbars which are highly elongated in the direction normal to the plane of the drawing.

FIG. 5(a): Metal coatings 0.2 mm–0.3 mm or 0.6 mm–0.9 mm thick sprayed on the top edges of the shearbar.

FIG. 5(b): Metal hardfacing 0.6 mm–0.9 mm thick sprayed on side edges of shearbar.

FIG. 5(c): Tool steel inlay on corners of shearbar by submerged arc welding. Alternatively, hardfacing on corners with PTA (Plasma Transferred Arc) welding.

FIG. 5(d): Cladding or hardfacing or Brazecoat M hardfacing (from Innobraze GmbH) on top surface.

FIG. 5(e): Sprayed on hardfacing on vertical edges and on centre of top surface.

FIG. 5(f): Hardfacing 0.4 mm–1 mm thick inlaid in centre of top surface and edge deposits of 1.2 mm–1.4 mm thick PTA.

FIG. 5(g): Heavy side edge hardfacing both inlayed and protruding, typically up to 3 mm thick.

FIG. 5(h): Heavy top edge hardfacing both inlayed and protruding, typically up to 3 mm thick. This corresponds to EP 8291198.

FIG. 5(i): Similar to (f) with edge hardfacing typically up to 3 mm thick both protruding and inlaid.

Embodiments of the invention will now be described, by way of example, with reference to the accompanying drawings, in which:

DETAILED DESCRIPTION OF THE DRAWINGS

DETAILED DESCRIPTION OF THE PREFERRED EMBODIMENTS

Figure 1:
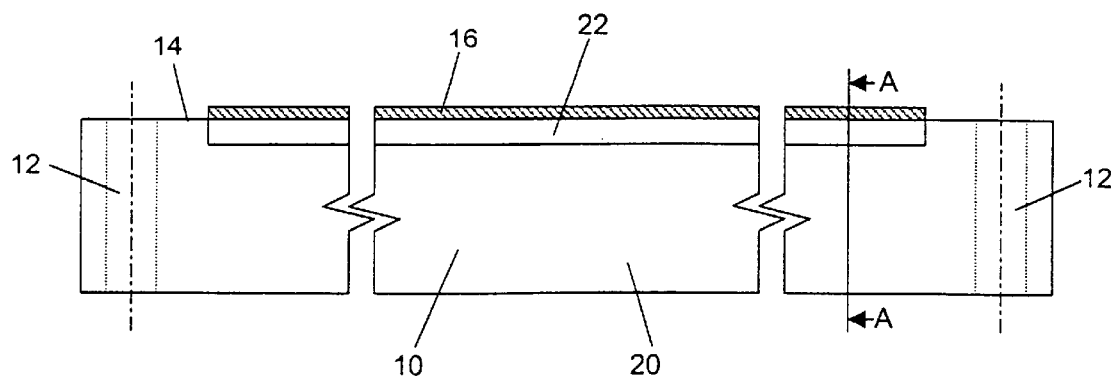
FIG. 1 is a side view of a first embodiment of shearbar according to the invention.
Figure 2:
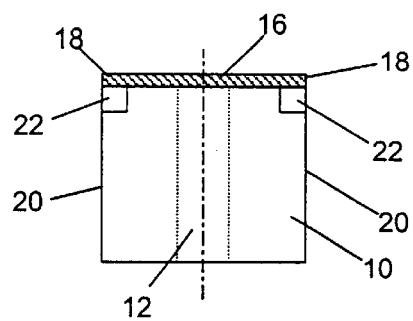
FIG. 2 is a cross-section through the shearbar taken on the line A—A in FIG. 1.
Figure 3:
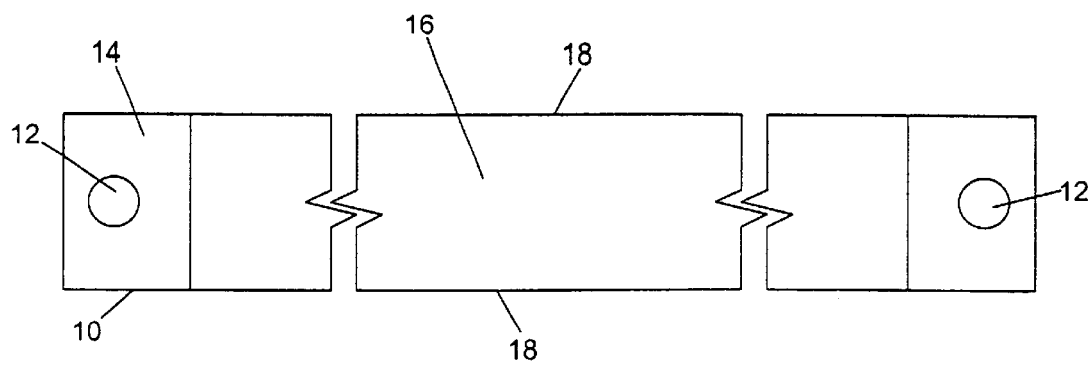
FIG. 3 is a plan view of the shearbar.
Figure 5:
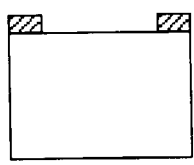
FIG. 5, previously described, show various prior art shearbars.
Figure 5:
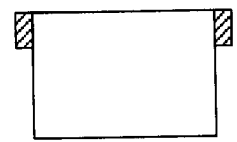
Figure 5:
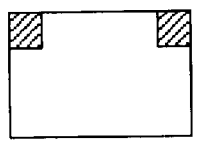
Figure 5:
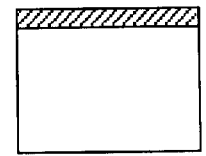
Figure 5:
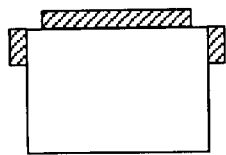
Figure 5:
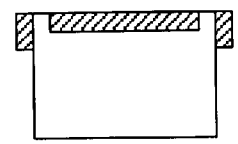
Figure 5:
Figure 5:
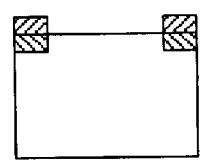
Figure 5:
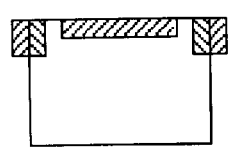

Referring to FIGS. 1 to 3 of the drawings, the shearbar comprises an elongate mild steel body 10 of substantially rectangular cross-section. At each end there may be any number of holes 12 which have a number of functions including allowing the shearbar to be removably bolted in position on a forage harvester. Holes also may allow for adjustment of shearbar position relative to the knives on the drum. There may also be holes to hold sensors and there are some designs which have no holes at all and use clamps to fasten the shearbar to the machine.

An area of the top surface 14 of the body 10 between the holes 12 is clad with a 1–2 mm thick coating 16 of a hardfacing material such as Brazecoat M mat material, marketed by Innobraze GmbH. The coating 16 extends the full width of the top surface 14 to form two parallel square (right-angled) longitudinal cutting edges 18, either of which may be positioned against the rotary cutter to act as a counter knife simply by unfastening the shearbar and turning it round. Alternatively, the coating 16 may comprise discrete strip(s) running along either one or both longitudinal edges of the top surface 14 of the body 10.

In order to avoid chipping and loss of the square cutting edges 18, each vertical side 20 of the body 10 has a respective steel inlay 22 extending along and immediately below each edge 18 of the coating 16. The inlays 22 have a hardness intermediate that of the mild steel body 10 and the coating 16, and are preferably made of tool steel with a hardness of from 40 to 70 Hrc. The inlays 22 are welded in place on the body 10 prior to placing the coating 16, after which the shearbar is ground and/or machined to its final dimensions.

Figure 4:
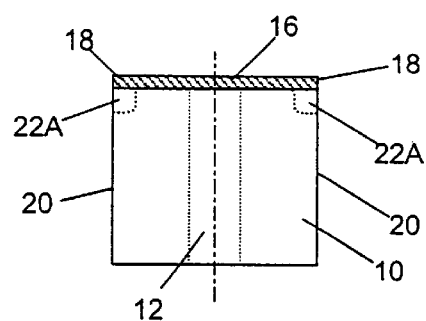
FIG. 4 is a cross-section through a second embodiment of shearbar according to the invention.

In an alternative embodiment, FIG. 4, the steel body 10 is heat-treated to locally harden the body along its top outer corners to form a pair of strips 22A running along and immediately below the longitudinal edges 18 of the coating 16. Like the inlays 22, the strips 22A have a hardness intermediate that of the bulk of the steel body 10 and the coating 16. The hardened strips 22A may be formed, prior to deposition of the coating 16, by heating the corners of the body 10 using an induction coil followed by quenching. Alternatively, the corners may be flame-heated followed by quenching.

The hardened strip 22A or tool steel inlays 22 prevent or delay the wear of the vertical sides 20 underneath the hardfacing layer 16. The hardfacing layer 16 itself provides the cutting edges 18 for the shearbar and a hard wearing surface for dealing with a large variety of plant matter for forage.

The invention is not limited to the embodiment described herein which may be modified or varied without departing from the scope of the invention.

What is claimed is:

1. A shearbar comprising an elongated steel body having a top surface covered with a layer of hardfacing material along at least one longitudinal edge to act as a counter knife to a rotary cutter, the body having a region extending along and immediately below the longitudinal edge of the hardfacing layer, the region having a hardness intermediate that of the steel body and the hardfacing layer.

2. A shearbar as claimed in claim 1, wherein the said region is an inlay.

3. A shearbar as claimed in claim 2, wherein the inlay is made of steel with a hardness of from 40 to 70 Hrc.

4. A shearbar as claimed in claim 1, wherein the said region is a locally heat-hardened portion of the body.

5. The shearbar as claimed in claim 1, wherein said top surface has a width, said layer covering said width of said top surface and forming two longitudinal edges along said body.

6. The shearbar as claimed in claim 5, wherein said two longitudinal edges form generally parallel cutting edges.

7. The shearbar as claimed in claim 1, wherein said layer comprises a discrete strip, said discrete strip extending along said at least one longitudinal edge.

8. The shearbar as claimed in claim 7, wherein said layer comprises at least two discrete strips, said discrete strips extending along two longitudinal edges to thereby form two cutting edges.

* * * * *

UNITED STATES PATENT AND TRADEMARK OFFICE
CERTIFICATE OF CORRECTION

PATENT NO. : 6,637,687 B2
APPLICATION NO. : 10/156531
DATED : October 28, 2003
INVENTOR(S) : Joseph Dillon It is certified that error appears in the above-identified patent and that said Letters Patent is hereby corrected as shown below:

Column 3:
Line 26, "arc" should be --are--.

Signed and Sealed this

Eighteenth Day of November, 2008

JON W. DUDAS
*Director of the United States Patent and Trademark Office*